(12) United States Patent
Stastny et al.

(10) Patent No.: US 10,500,463 B2
(45) Date of Patent: Dec. 10, 2019

(54) ICE SKATING MEASURING APPARATUS

(71) Applicant: Charles University in Prague, Faculty of Physical Education and Sport, Department of sport games, Prague Veleslavin (CZ)

(72) Inventors: Petr Stastny, Vsetin (CZ); Petr Kubovy, Brevnov (CZ); Frantisek Lopot, Nusle (CZ); Karel Jelen, Bubenec (CZ)

(73) Assignee: Charles University in Prague, Faculty of Physical Education and Sport, Department of Sport Games, Prague (CZ)

(*) Notice: Subject to any disclaimer, the term of this patent is extended or adjusted under 35 U.S.C. 154(b) by 141 days.

(21) Appl. No.: 15/628,151

(22) Filed: Jun. 20, 2017

(65) Prior Publication Data

US 2018/0333628 A1 Nov. 22, 2018

(30) Foreign Application Priority Data

May 16, 2017 (CZ) .................................. 2017-274

(51) Int. Cl.
| | |
|---|---|
| *A63B 69/00* | (2006.01) |
| *A43B 5/16* | (2006.01) |
| *A63B 24/00* | (2006.01) |
| *A63C 1/22* | (2006.01) |
| *G01L 5/00* | (2006.01) |

(Continued)

(52) U.S. Cl.
CPC ............ *A63B 69/0022* (2013.01); *A43B 5/16* (2013.01); *A63B 24/0062* (2013.01); *A63C 1/06* (2013.01); *A63C 1/22* (2013.01); *A63C 1/303* (2013.01); *A63B 2220/40* (2013.01); *A63B 2220/51* (2013.01); *A63B 2220/803* (2013.01); *A63B 2220/833* (2013.01); *A63B 2244/183* (2013.01); *A63C 2203/18* (2013.01); *A63C 2203/22* (2013.01); *A63C 2203/24* (2013.01); *A63C 2203/42* (2013.01); *G01L 5/00* (2013.01)

(58) Field of Classification Search
CPC ... A63B 69/0022; A63B 24/0062; A43B 5/16; A63C 1/06; A63C 1/22; A63C 1/303
See application file for complete search history.

(56) References Cited

U.S. PATENT DOCUMENTS

| | | | |
|---|---|---|---|
| 6,539,336 B1* | 3/2003 | Vock | A42B 3/0433 |
| | | | 702/178 |
| 7,107,706 B1* | 9/2006 | Bailey, Sr. | A43B 3/0005 |
| | | | 36/29 |

(Continued)

FOREIGN PATENT DOCUMENTS

| | | |
|---|---|---|
| CN | 103355831 A | 10/2013 |
| CN | 203969383 U | 12/2014 |

(Continued)

*Primary Examiner* — Manual A Rivera Vargas
*Assistant Examiner* — Yaritza H Perez Bermudez
(74) *Attorney, Agent, or Firm* — Thedford I. Hitaffer; Hitaffer & Hitaffer, PLLC

(57) ABSTRACT

An ice-skating measuring apparatus includes an ice-skate blade holder and an ice-skate blade. The blade holder has a front beam column and a rear beam column. The blade includes at least one sensor configured to measure forces acting on the blade, and the blade is detachable from the blade holder.

14 Claims, 3 Drawing Sheets

(51) Int. Cl.
  *A63C 1/30*    (2006.01)
  *A63C 1/06*    (2006.01)

(56) References Cited

U.S. PATENT DOCUMENTS

| | | | | |
|---|---|---|---|---|
| 7,866,674 | B2* | 1/2011 | Weber | A63C 1/30 |
| | | | | 219/211 |
| 2003/0107192 | A1* | 6/2003 | Furzer | A63C 1/00 |
| | | | | 280/11.12 |
| 2005/0029247 | A1* | 2/2005 | Furzer | A63C 1/30 |
| | | | | 219/490 |
| 2007/0061106 | A1* | 3/2007 | Vock | G01P 3/50 |
| | | | | 702/182 |
| 2009/0241753 | A1* | 10/2009 | Mann | G10D 17/00 |
| | | | | 84/384 |
| 2010/0253020 | A1* | 10/2010 | Weber | A63C 1/30 |
| | | | | 219/211 |
| 2011/0166821 | A1* | 7/2011 | Kim | A63B 69/0022 |
| | | | | 702/141 |
| 2013/0093150 | A1* | 4/2013 | Dahlo | A63C 1/303 |
| | | | | 280/11.18 |
| 2016/0038788 | A1* | 2/2016 | McMillan | G01L 5/18 |
| | | | | 73/488 |
| 2016/0217325 | A1* | 7/2016 | Bose | G11B 27/17 |

FOREIGN PATENT DOCUMENTS

| | | |
|---|---|---|
| CN | 105725355 A | 7/2016 |
| WO | 2009146525 A1 | 12/2009 |

* cited by examiner

ICE SKATING MEASURING APPARATUS

CROSS-REFERENCE TO RELATED APPLICATIONS

This application claims priority from CZ Patent Application No. PV 2017-274, filed May 16, 2017, the disclosure of which is incorporated herein by reference.

BACKGROUND OF THE INVENTION

The present invention relates to the field of ice-skating measuring apparatuses. More precisely, the present invention brings a new possibility to detect, store, and transmit data related to kinetics and force that act on an ice-skate during skating. In addition to contact forces, the apparatus is designed to measure other parameters of movement, such as acceleration, velocity, or orientation.

As scientific and health (medical) data have played a significant role in the performance evaluation of professional sportsmen, a considerable effort to incorporate various sensors right into the sports equipment has begun to rise. In general, such sensors are used for measuring forces acting on both the sportsmen and the equipment as well as other parameters which are very helpful in optimizing sportsmen's performance and training methods.

A great deal of attention is devoted to the footwear of sportsmen. The reason is that the interactions between the piece of footwear and the playing or training surface represent the overall forces which act on sportsmen in many cases. The detailed analysis of interactions between boots and the ground is quite important for further optimization of sportsmen's performance, since it gives valuable information about the sportsmen's technique, loading, and habits.

There is a noticeable trend to implement various sensors into the sole of running or athlete shoes. Among other functions, sensors are able to measure the pressure (force) acting on the feet or the strain inside the shoe sole. An example of such an invention is described in the document CN105725355 where the pressure sensors inside the shoes are disclosed. The document describes a front sole pressure sensor and a rear heel pressure sensor. Both sensors are connected to the central unit where the overall pressure is evaluated. The described invention is used as an early knee joint damage warning system.

Another example of said group of inventions is disclosed in a patent application CN103355831. Said document discloses running shoes equipped with acceleration sensors. The sportsmen thus have the immediate information about their running performance. The acceleration sensors are placed into the shoe sole.

Yet another example of sensors being used as a source of information about forces acting on shoes is the utility model CN203969383. The sensor apparatus is attached to the shoe sole. The main function of the said sensor apparatus is to provide information about the horizontal strain acting on the shoes. However, it is also used to collect the information about vertical force to calculate landing and flight time.

Besides running or athlete shoes, there are also known inventions related to the utilization of sensors in ice-skates. Such sensors are used in many variations, but the general idea is to provide the same information as the sensors used in the running or athlete shoes.

An example of such sensor apparatus is disclosed in the patent application US20110166821. A sensor configured to measure acceleration and deceleration of an ice-skate during skating is attached to the side of ice-skate boot. The information coming from the sensor is transmitted to a control unit attached to the sportsman's leg. The obvious disadvantage of this invention is the necessity of placing both the sensor and the control unit on a side of the boot, respectively leg. Another disadvantage of such apparatus is a limited range of information coming from the sensor.

Another example of an ice-skate sensor is disclosed in the document US20160038788. The said document describes a measuring apparatus comprising sensors and control units. The mentioned sensors are placed between an ice-skate boot and an ice-skate blade holder, while the control units are placed just below the sensor inside column beams of the ice-skate blade holder. The evident disadvantage is the placing of the sensors between the boot and the blade holder. The ice-skater thus has to replace either the boot or the blade holder in case he wants to change the type of sensor or the ice-skate boot.

Yet another example of such apparatus, which is configured to monitor the ice-skater moving, is disclosed in the patent application WO2009146525. The patent application discloses an apparatus for measuring various types of movement characteristics. The apparatus consists of two parts: a control unit and sensors. The sensors may be attached to the body of the ice-skater as well as on his equipment, such as helmet or stick. Said sensors are configured to measure information about acceleration, skating time, etc. The control unit is placed between column beams of a skate blade holder. The control unit is configured to collect the information transmitted from the sensors. The obvious disadvantage of the described apparatus is the arrangement of the control unit between the column beams of the ice-skate blade holder, increasing the chance of damage. The described apparatus is intended for use in ice-hockey, where there is high probability of hitting the control unit by a hockey puck. The said document also fails in providing the means for measuring the forces acting on ice-skate boots.

SUMMARY OF THE INVENTION

The above-mentioned disadvantages are partially overcome by the present invention of an ice-skating measuring apparatus comprising an ice-skate blade holder and an ice-skate blade. The said blade holder comprises a front beam column and a rear beam column, wherein the blade comprises at least one sensor configured to measure forces acting on the blade. Another important feature of the invention is that the blade is detachable from the blade holder.

The appropriate function of the present invention is achieved by using at least one sensor selected from a group of a wire and foil strain gauge sensors, capacitive displacement sensors, semiconductor strain gauge sensors or piezoelectric sensors. Another advantage is that the signal from at least one sensor is acquired as separate signal.

Yet another improvement of the present invention is achieved by using a temperature sensing element. In addition, at least one sensor could be placed in a spline in the blade.

The ice-skating measuring apparatus further comprises at least one electrical component selected from a group of a kinetic unit, a datalogger, an A/D transducer, an energy supply and a force amplifier, wherein at least one electrical component from the said group is placed inside the front beam column or the rear beam column.

Another advantage of the present invention is that the kinetic unit and the force amplifier may be attached to an adjustable clamp, wherein the adjustable clamp is placed between the front beam column and the rear beam column, wherein the kinetic unit and the amplifier are connected to the datalogger, and the A/D transducer and the energy supply are placed in an external unit.

Another important feature of the present invention is that the blade of the ice-skating measuring apparatus comprises at least one sensor selected from a group of a front medial sensor, a front lateral sensor, a rear medial sensor and a rear lateral sensor. In addition, a signal from the front medial sensor, the front lateral sensor, the rear medial sensor or the rear lateral sensor is acquired as separate signal.

The ice-skating measuring apparatus is as defined in claim 9, wherein the front medial sensor and the rear medial sensor are placed on the medial side of the blade in the region under the front beam column and the front lateral sensor and the rear lateral sensor are placed on the lateral side of the blade in the region under the rear beam column.

In yet another embodiment, the signal from sensors is synchronized and it is acquired together with the data from the kinetic unit, which contains at least one gauge selected from a group of a three-axis gyroscope, a three-axis accelerometer and a distance sensor.

The connection of all electrical components is made by means of wires in such a way that the sensors on the blade are wired to the force amplifiers and the force amplifiers are wired to A/D transducer, which is further wired to the datalogger and the energy supply, and at the same time the kinetic unit is wired to the A/D transducer, which is further wired to the datalogger and the energy supply.

In another embodiment, the connection may be made in the following manner. The sensors on the blade are wired to the force amplifiers and the force amplifiers and the kinetic unit are wired to the energy supply. Further, the force amplifiers and the kinetic unit are wired to the A/D transducer, which is further wired to the datalogger.

DETAILED DESCRIPTION OF THE PREFERRED EMBODIMENT

Figure 1:
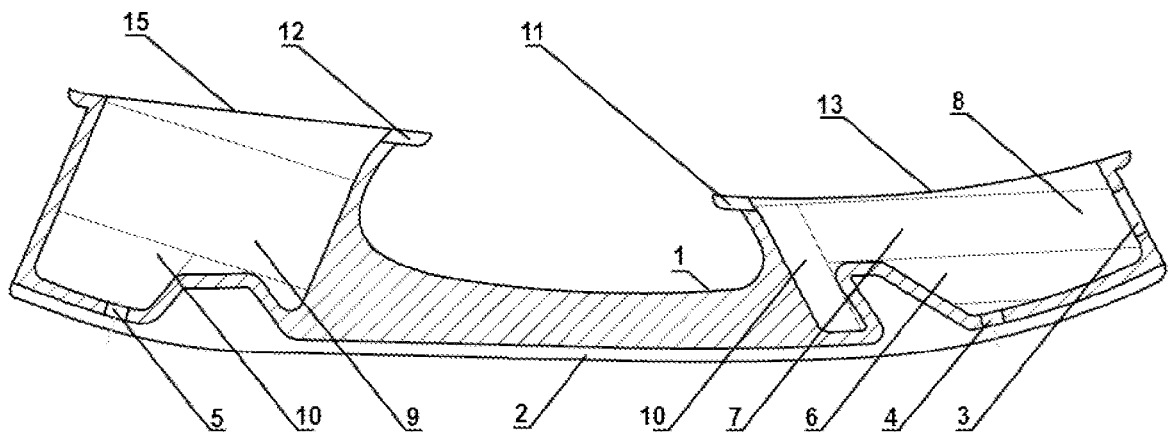
FIG. 1 is a schematic view of an ice-skate blade holder with sensors placed inside a blade.

FIG. 1 is a schematic view of an ice-skate blade holder 1 and a blade 2, wherein the blade 2 has its medial side and lateral side. The blade holder 1 comprises a front beam column 13 and a rear beam column 15. Both columns are designed as any commercially used ice-hockey skate blade holders, wherein electrical components can be placed inside the said columns.

The measuring apparatus of this invention comprises at least one sensor configured for measuring forces, preferably a set of at least four such sensors placed on the blade 2. In one embodiment, a front medial sensor 20 is placed on the top of the medial side of the blade 2 in the region under the front beam column 13 and a rear medial sensor 21 is placed on the top of the medial side of the blade 2 in the region under the rear beam column 15.

In another embodiment, there is a front lateral sensor 16 and a rear lateral sensor 17, placed on a side of the blade 2. An example of these lateral sensors is provided in FIG. 2. The front medial sensor 20 and the rear medial sensor 21 are placed in approximately the same position as the front lateral sensor 16 and the rear lateral sensor 17, but on the medial side of the blade 2.

The front medial sensor 20 is designed to measure the forces acting on the blade 2. More precisely, the forces emerging between a surface (an ice rink) and the blade 2 during skating are transferred through the blade 2, which brings the possibility of measuring them as forces acting between the blade 2 and the blade holder 1. Such forces can be measured by means of wire and foil strain gauges, semiconductor strain gauges, piezoelectric gauges or any other type of strain gauges. The sensors are designed to measure tension, pressure and bend. The measuring apparatus can be preferably equipped with a temperature sensing element 18, which is used for measuring the temperature near the sensors and which is used for compensating the thermal effect. There is a number of well-known thermometers having temperature sensing elements 18 that can be placed close to the sensors on the blade 2. Such temperature sensing elements 18 can be incorporated in a sensor arrangement configured for measuring forces The front medial sensor 20 is further connected with a force amplifier 10, which is placed inside the front beam column 13. The signal coming from the front medial sensor 20 is amplified there and is further collected or transmitted via the other electrical components placed inside the front beam column 13. Such electrical component may be a kinetics unit 6, a datalogger 7 and an A/D transducer 8. In addition, it is an essential requirement to provide an electric power supply 9, such as a battery or a battery box.

The rear medial sensor 21, front lateral sensor 16 and rear lateral sensor 17 are used in the same way as the front medial sensor 20 described above. The forces acting on the blade 2 can be measured by wire and foil strain gauges, semiconductor strain gauges, piezoelectric gauges or any other type of gauges. The signal is amplified in the force amplifier 10 and it is then collected or transmitted via other electrical components, such as the kinetic unit 6, the datalogger 7 and the A/D transducer 8. The front sensors are connected with the electrical components through a front beam wire slot 4, while the rear sensors are connected with the electrical components through the rear beam wire slot 5. The kinetic unit 6 further contains at least one gauge selected from a group of three-axis gyroscope, three-axis accelerometer and distance sensor synchronized. The signal from the kinetic unit 6 is synchronized and acquired together with sensors on the skate blade 2.

Preferably, all four sensors are coupled to the quarter-bridge. Such connection allows to add or subtract the signal in a software. Arrangement of the four sensors along the whole blade 2 is advantageous, because such an arrangement allows to specify the point in which the force is acting, e.g. whether the force is acting on the forefront of the blade 2 or on the rear part of the blade 2, and also to specify the direction of the force acting, i.e. medial-lateral or lateral medial directions.

The connection between the rear beam column 15 and the front beam column 13, which is used for transferring a signal from the rear medial sensor 21 and rear lateral sensor 17 to the front beam column 13, is provided by wires arranged between a rear wire corridor 12 and a front wire corridor 11.

Subsequently, a processed signal is transferred to the port 3 where it can be either transmitted via wi-fi or downloaded via USB port.

An important feature of the described invention is that the blade 2 is designed to be exchangeable. Since the sensors are placed on the blade 2, there is a possibility to use either different type of sensors or different type of blade. For that reason, the electrical components can be placed inside the columns permanently and the skater can choose whether he uses sensors (and which type) or not.

Yet another advantage of the described invention is that the electrical components are hidden inside the columns, so that they are also protected from damage. The sensors placed on the blade 2 are likely to be damaged, so the fact that blade 2 is detachable from the blade holder 1, and therefore easily interchangeable, is very advantageous.

Figure 2:
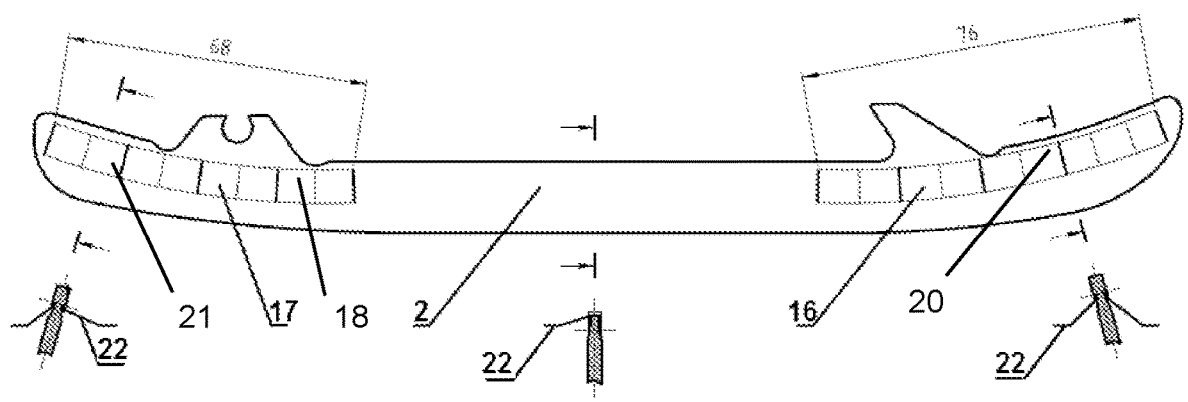
FIG. 2 is a schematic view of an ice-skate blade with attached sensors.

FIG. 2 is a schematic view of the blade 2. There are two lateral sensors 16 and 17 placed on a side of the blade 2 and two medial sensors 20 and 21 placed on a side of the blade 2. A front lateral sensor 16 is placed in the region under the front beam column 13 and a rear lateral sensor 17 is placed in the region under the rear beam column 15. The front medial sensor 20 is placed in the region under the front beam column 13 and the rear medial sensor 21 is placed in the region under the rear beam column 15. All the sensors 16, 17, 20 and 21 are designed to measure the lateral forces acting on the blade 2 as well as to distinguish the medial-lateral or the lateral-medial directions. Preferably, both lateral sensors can be coupled to the temperature sensing element 18, which is used for measuring and offsetting the influence of temperature. In yet another preferred embodiment, the sensors are placed in the sensor splines 22. Such arrangement significantly increases the life-time of sensors.

Figure 3:
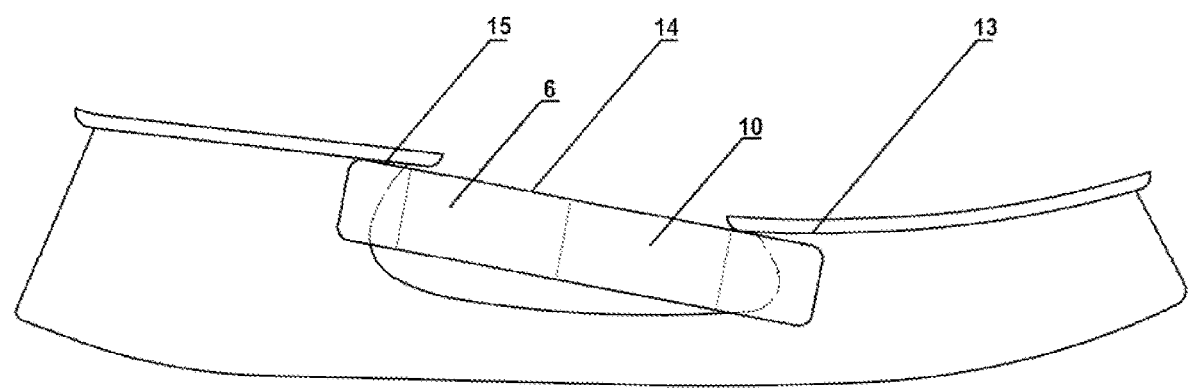
FIG. 3 is a schematic view of an ice-skate blade holder with an adjustable clamp.

FIG. 3 is a schematic view of an ice-skate blade holder 1. A blade holder 1 comprises a front beam column 13 and a rear beam column 15, between which an adjustable clamp 14 is placed. There is also a kinetic unit 6 and a force amplifier 10 attached to the adjustable clamp 14. Such arrangement allows using the sensors without the electronics placed inside the blade holder columns, which could be advantageous under some specific circumstances. In this embodiment, the sensors are connected to the force amplifier 10 and the kinetic unit 6 with wires.

Figure 4:
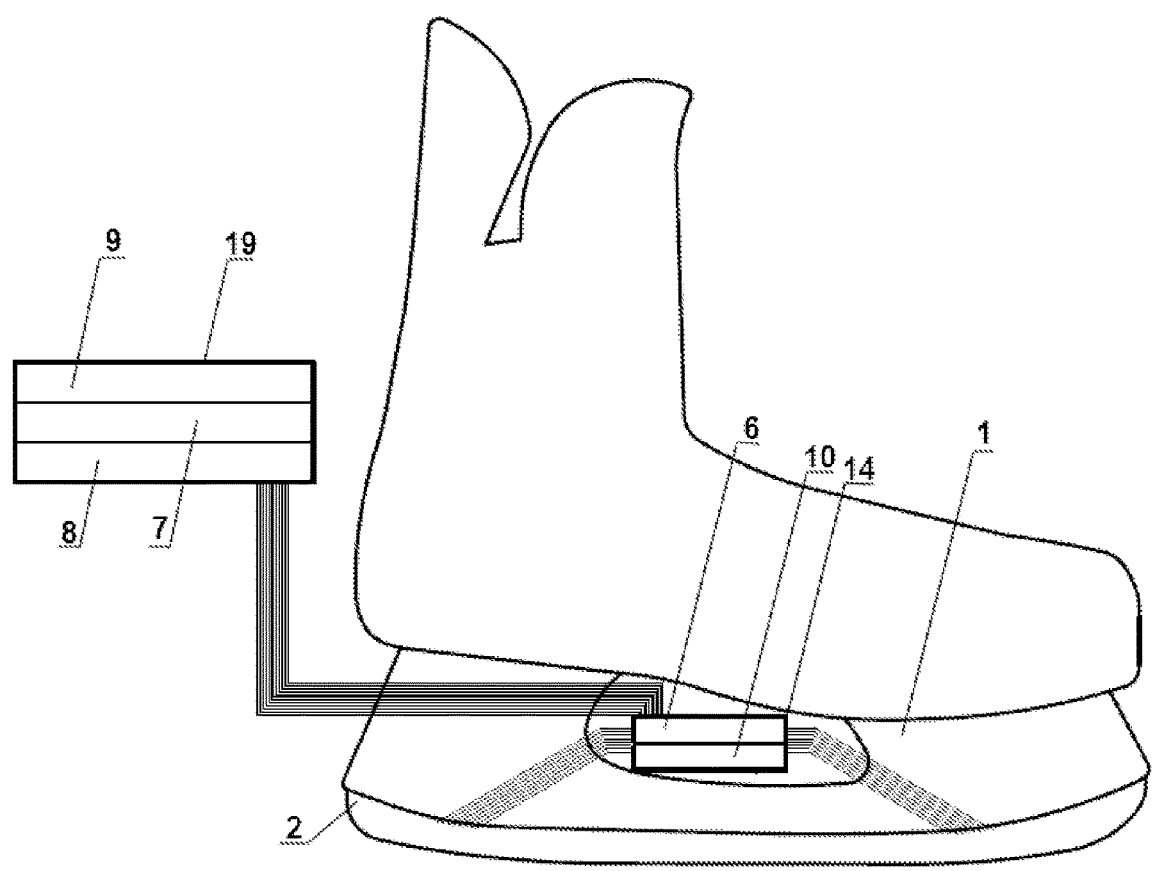
FIG. 4 is a schematic view of an ice-skate boot with an external unit.

FIG. 4 is a schematic view of an ice-skate boot. The ice-skate boot comprises a blade holder 1 and a blade 2. The blade 2 comprises a set of sensors which are connected to a kinetic unit 6 and a force amplifier 10 attached to an adjustable clamp 14, which is placed between blade holder columns 13 and 15. The kinetic unit 6 and the amplifier 10 are further connected with an external unit 19, in which a datalogger 7, an A/D transducer 8 and an energy supply 9 are placed. The external unit 19 could be attached to the ice-skate boot or to the skater.

Figure 5:
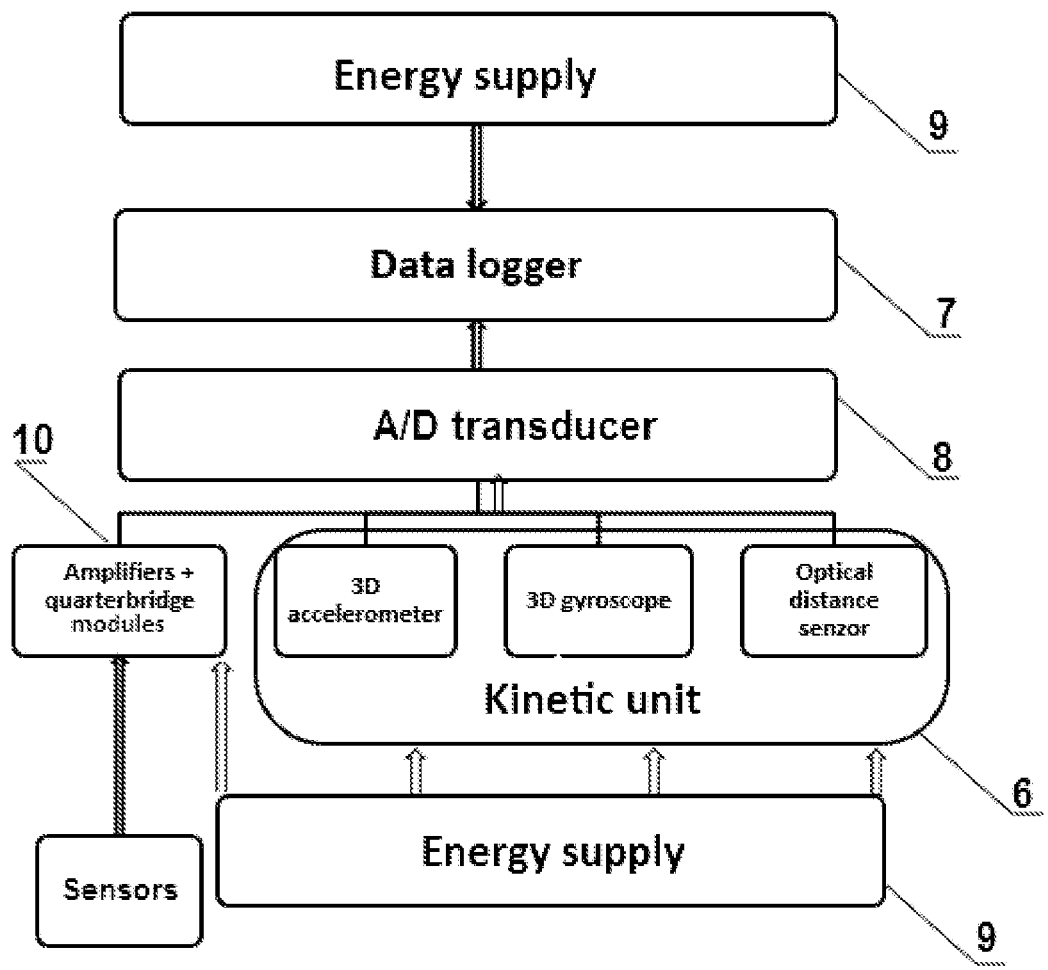
FIG. 5 is a schematic flowchart of connection of electrical components.

FIG. 5 is a schematic view of connection between the electrical components. The sensors placed on the blade 2 are connected to the quarter-bridge modules and the signal coming from them is amplified in force amplifiers 10. The sensors 16, 17, 20 and 21 are further connected to a A/D transducer 9. There is also a kinetic unit 6, which is connected to the A/D transducer 9. The kinetic unit 6 comprises at least one gauge from a group of 3D accelerometer, 3D gyroscope, optical distance sensor or any other motion, velocity, acceleration or position sensor. In advantageous embodiment, both the force amplifiers 10 and the kinetic unit 6 are connected to the energy supply 9. Further, in the connection sequence, the A/D transducer is connected with a datalogger 7, which is supplied by an energy supply 9.

LIST OF REFERENCE NUMBERS

1 . . . blade holder
2 . . . blade
3 . . . port
4 . . . front blade wire slot
5 . . . rear blade wire slot
6 . . . kinetics unit
7 . . . datalogger
8 . . . A/D transducer
9 . . . energy supply
10 . . . force amplifier
11 . . . front wire corridor
12 . . . rear wire corridor
13 . . . front beam column
14 . . . adjustable clamp
15 . . . rear beam column
16 . . . front lateral sensor
17 . . . rear lateral sensor
18 . . . temperature sensing element
19 . . . external unit
20 . . . front medial sensor
21 . . . rear medial sensor
22 . . . sensor spline

The invention claimed is:

1. An ice-skating measuring apparatus, comprising an ice-skate blade holder and an ice-skate blade, wherein the blade holder comprises a front beam column and a rear beam column, wherein the blade comprises at least one sensor configured to measure forces acting on the blade, and wherein the blade is detachable from the blade holder, wherein the at least one sensor on the blade is wired to force amplifiers, the force amplifiers and a kinetic unit are wired to an A/D transducer, which is further wired to a datalogger, and wherein the force amplifiers and the kinetic unit are wired to an energy supply, or the A/D transducer is wired to the energy supply.

2. The ice-skating measuring apparatus according to claim 1, wherein the at least one sensor is selected from a group of wire and foil strain gauge sensors, capacitive displacement sensors, semiconductor strain gauge sensors and piezoelectric sensors.

3. The ice-skating measuring apparatus according to claim 1, wherein a signal from the at least one sensor is acquired as a separate signal.

4. The ice-skating measuring apparatus according to claim 1, wherein the measuring apparatus further comprises a temperature sensing element.

5. The ice-skating measuring apparatus according to claim 1, wherein the at least one sensor is placed in a spline in the blade.

6. The ice-skating measuring apparatus according to claim 1, wherein at least the kinetic unit or the datalogger or the A/D transducer or the energy supply or the force amplifier is placed inside the front beam column or the rear beam column.

7. The ice-skating measuring apparatus according to claim 6, wherein the at least one sensor on the blade is wired to the force amplifiers and the force amplifiers and the kinetic unit are wired to the energy supply, further the force amplifiers and the kinetic unit are wired to the A/D transducer, which is further wired to the datalogger.

8. The ice-skating measuring apparatus as defined in claim 1, wherein the blade comprises at least one sensor selected from a group of a front medial sensor, a front lateral sensor, a rear medial sensor and a rear lateral sensor.

9. The ice-skating measuring apparatus as defined in claim 8, wherein the front medial sensor and the front lateral sensor are placed in a region under the front beam column the rear medial sensor and the rear lateral sensor are placed in a region under the rear beam column.

10. The ice-skating measuring apparatus according to claim 1, wherein a signal from sensors is synchronized and acquired together with data from the kinetic unit, which contains at least one gauge selected from a group of a three-axis gyroscope, a three-axis accelerometer and a distance sensor.

11. An ice-skating measuring apparatus comprising an ice-skate blade holder and an ice-skate blade, wherein the blade holder comprises a front beam column and a rear beam column, wherein the blade comprises at least one sensor configured to measure forces acting on the blade, and wherein the blade is detachable from the blade holder, the apparatus further comprising at least one electrical component selected from a group of a kinetic unit, a datalogger, an A/D transducer, an energy supply and a force amplifier, wherein the kinetic unit and the force amplifier are attached to an adjustable clamp, wherein the adjustable clamp is placed between the front beam column and the rear beam column, wherein the kinetic unit and the force amplifier are connected to the datalogger, wherein the A/D transducer and the energy supply are placed in an external unit.

12. The ice-skating measuring apparatus according to claim 11, wherein the at least one sensor on the blade are wired to the force amplifiers and the force amplifiers are wired to A/D transducer, which is further wired to the datalogger and the energy supply, and at the same time the kinetic unit is wired to the A/D transducer which is further wired to the datalogger and the energy supply.

13. An ice-skating measuring apparatus, comprising an ice-skate blade holder and an ice-skate blade, wherein the blade holder comprises a front beam column and a rear beam column, wherein the blade comprises at least one sensor configured to measure forces acting on the blade, and wherein the blade is detachable from the blade holder, wherein the at least one sensor on the blade is wired to force amplifiers and the force amplifiers are wired to an A/D transducer, which is further wired to a datalogger and an energy supply, and at the same time a kinetic unit is wired to the A/D transducer which is further wired to the datalogger and the energy supply.

14. An ice-skating measuring apparatus, comprising an ice-skate blade holder and an ice-skate blade, wherein the blade holder comprises a front beam column and a rear beam column, wherein the blade comprises at least one sensor configured to measure forces acting on the blade, and wherein the blade is detachable from the blade holder, wherein the at least one sensor on the blade is wired to force amplifiers and the force amplifiers and a kinetic unit are wired to an energy supply, further the force amplifiers and the kinetic unit are wired to an A/D transducer, which is further wired to a datalogger.

* * * * *